(No Model.)

I. W. ALLYN.
HORSESHOE FASTENING.

No. 503,397. Patented Aug. 15, 1893.

WITNESSES:
P. H. Eagle.
Wm. C. Wiedersheim.

INVENTOR
Isaac W. Allyn,
BY
John A. Wiedersheim,
ATTORNEY

UNITED STATES PATENT OFFICE.

ISAAC W. ALLYN, OF LANSDOWNE, PENNSYLVANIA.

HORSESHOE-FASTENING.

SPECIFICATION forming part of Letters Patent No. 503,397, dated August 15, 1893.

Application filed September 29, 1892. Serial No. 447,216. (No model.)

*To all whom it may concern:*

Be it known that I, ISAAC W. ALLYN, a citizen of the United States, residing at Lansdowne, in the county of Delaware, State of Pennsylvania, have invented a new and useful Improvement in Horseshoe-Fastenings, which improvement is fully set forth in the following specification and accompanying drawings.

My invention consists of a device for fastening a shoe to the hoof of a horse or other animal, in lieu of nailing, the same embodying a spring which is adapted to embrace or clamp the hoof, and having its ends connectible with the heel ends of the sections of the shoe, said spring being provided with a coil to increase its resiliency and afford a broad bearing on the hoof, as also to form an attachment for clips which are fastened to the toe ends of the sections, the heel ends of the sections being provided with arms which close and steady the same, and carrying a nut for locking said arms, all as will be hereinafter fully set forth.

Figure 1:
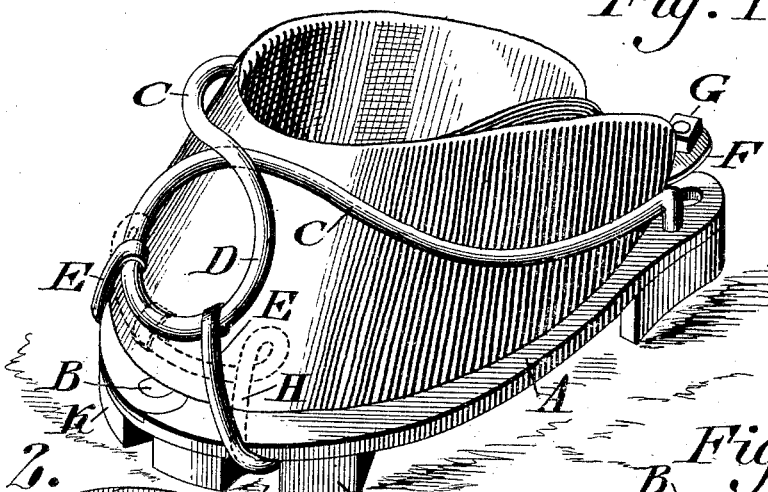
Figure 2:
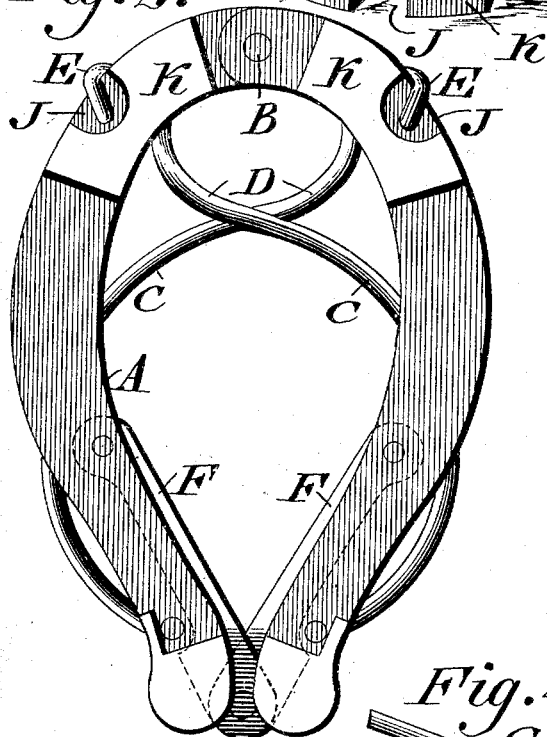
Figure 3:
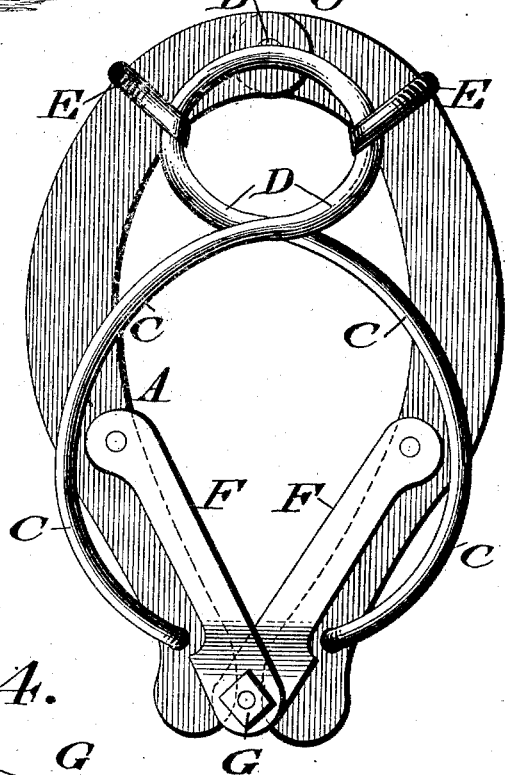
Figure 4:
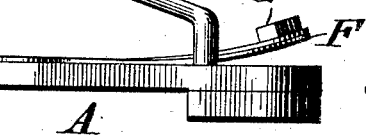

Figure 1 represents a perspective view of a horse shoe fastening embodying my invention. Figs. 2 and 3 represent views of the upper and lower faces thereof. Fig. 4 represents a side elevation of a portion thereof.

Similar letters of reference indicate corresponding parts in the several figures.

Referring to the drawings: A designates a horseshoe which is formed in sections connected at the toe end by a pivot or hinge B, whereby said sections may open and close in lateral directions.

C designates a spring or spring clamp which is adapted to embrace the hoof, and having its rear ends secured to the heel ends of the sections of the shoe. In the length of the spring at the front of the hoof, is a coil D which rests against the hoof and provides a large bearing for the spring on the hoof and increases the resiliency thereof.

E designates clips which are hooked upon or otherwise secured to the coil D and to the toe ends of the sections of the shoe, whereby said ends are connected with the hoof-embracing spring C.

Pivoted to the heel ends of the sections of the shoe are arms F which are pivoted to each other and open and close after the manner of a toggle, and serve to connect said heel ends, and close and steady the same. On the pivot which connects the rear ends of the arms F is a nut G which serves to prevent movement of said arms, and consequently locks the sections of the shoe on the hoof after adjustment of the same thereon. It will be seen that the sections may be separated so as to locate the shoe and its fastening devices on the hoof after which the shoe is closed on the hoof by the action of the spring and firmly clamped and retained thereon, the nut G preventing displacement of the same as is evident. When the shoe is to be removed, the nut is loosened and the sections separated, the spring yielding and permitting such separation.

While two clips E are shown, I may employ a continuous clip as shown at H in dotted lines in Fig. 1, without producing different results from those stated.

In order to guard the lower ends of the clips E, the same are sunk in recesses J in the toe calks K of the shoe.

Having thus described my invention, what I claim as new, and desire to secure by Letters Patent, is—

1. An animal shoe formed of pivoted sections and provided with means for securing said sections in fixed position, in combination with a spring adapted to be secured to said shoe, and embrace the hoof of the animal to which said shoe is secured, and a clamp attached to said spring and shoe, substantially as described.

2. The spring C having its ends connected with the heel ends of the sections of a shoe, and formed with a coil in front, the spring being adapted to embrace the hoof, and the coil to rest thereupon as a broad bearing and increasing the resiliency of the spring, substantially as described.

3. A shoe formed in sections pivoted together, and toggle arms connected with the heel ends of the sections, in combination with a spring which is adapted to embrace the hoof, and having its ends secured to said heel ends, and a nut on said arms for locking said heel ends, substantially as described.

4. An animal shoe in combination with a spring having end portions secured thereto, and an enlarged portion bearing on the hoof of the animal to which the shoe is attached, and a clamp secured to said enlarged portion and shoe, substantially as described.

ISAAC W. ALLYN.

Witnesses:
JOHN A. WIEDERSHEIM,
A. P. JENNINGS.